(12) United States Patent
Comte et al.

(10) Patent No.: US 8,198,201 B2
(45) Date of Patent: Jun. 12, 2012

(54) COLORED GLASS-CERAMIC MATERIALS AND COLORED ARTICLES MADE OF SUCH GLASS-CERAMIC MATERIALS

(75) Inventors: Marie Jacqueline Monique Comte, Fontenay aux Roses (FR); Philippe Lehuede, Yerres (FR); Isabelle Marie Chauvel-Melscoet, Bois-le-Roi (FR); Daniel Louis Gabriel Ricoult, Horseheads, NY (US)

(73) Assignee: Eurokera, Chateau-Thierry (FR)

( * ) Notice: Subject to any disclaimer, the term of this patent is extended or adjusted under 35 U.S.C. 154(b) by 118 days.

(21) Appl. No.: 12/789,547

(22) Filed: May 28, 2010

(65) Prior Publication Data

US 2010/0304948 A1   Dec. 2, 2010

(51) Int. Cl.
*C03C 10/12* (2006.01)
*C03C 10/14* (2006.01)

(52) U.S. Cl. .................. 501/4; 501/7; 65/33.1; 65/33.8

(58) Field of Classification Search .............. 501/4, 7; 65/33.1, 33.8
See application file for complete search history.

(56) References Cited

U.S. PATENT DOCUMENTS

| | | | | |
|---|---|---|---|---|
| 4,526,872 A * | 7/1985 | Andrieu et al. | | 501/4 |
| 4,835,121 A * | 5/1989 | Shibuya et al. | | 501/4 |
| 5,070,045 A | 12/1991 | Comte et al. | | 501/4 |
| 5,212,122 A * | 5/1993 | Pannhorst et al. | | 501/69 |
| 7,456,121 B2 * | 11/2008 | Comte | | 501/4 |
| 7,465,686 B2 * | 12/2008 | Comte | | 501/4 |
| 7,473,660 B2 * | 1/2009 | Comte | | 501/4 |
| 2004/0121895 A1 | 6/2004 | Comte et al. | | 501/69 |
| 2007/0004578 A1 * | 1/2007 | Monique Comte | | 501/4 |
| 2007/0129231 A1 | 6/2007 | Comte et al. | | 501/4 |
| 2008/0026927 A1 * | 1/2008 | Monique Comte | | 501/7 |
| 2010/0130341 A1 * | 5/2010 | Wondraczek | | 501/4 |

FOREIGN PATENT DOCUMENTS

EP   131675 B1 *   5/2009

* cited by examiner

*Primary Examiner* — Karl Group
(74) *Attorney, Agent, or Firm* — Michael W. Russell

(57) ABSTRACT

Transparent β-quartz glass-ceramics containing vanadium oxide. Such glass-ceramics have advantageous optical properties including good transmission in the infrared range, low transmission in the visible range, and significant transmission in the blue range for thicknesses of 3 mm. They can be used as materials for cooking top plates.

11 Claims, No Drawings

COLORED GLASS-CERAMIC MATERIALS AND COLORED ARTICLES MADE OF SUCH GLASS-CERAMIC MATERIALS

CROSS-REFERENCE TO RELATED APPLICATIONS

This application claims priority to French Patent Application Number 0953560, which was filed May 29, 2009, the entire contents of which are incorporated herein by reference.

BACKGROUND AND SUMMARY

The present disclosure relates to the field of glass-ceramics, and more particularly to the field of transparent dark-colored glass-ceramics that contain a solid solution of β-quartz as the main crystalline phase. Such glass-ceramics can be used as cooking top plates, which cover heating elements such as halogen or radiant hearth type heating elements. Such top plates are generally from 3 to 5 mm thick.

The manufacture of articles made of n-quartz glass-ceramic comprises three main successive steps. A first step includes melting a mineral glass or a mixture of mineral raw materials, which is a precursor of such a glass, and is generally performed between 1550 and 1750° C., followed by refining the molten glass obtained. A second step involves cooling and forming the molten glass obtained. A third step involves crystallization or ceramming of the cooled formed glass, which usually comprises a suitable heat treatment (including steps of nucleation and growth of crystals).

As regards the first step, it may be advantageous to adapt the infrared transmission of the glass to the mode of melting. In a context of using combustion furnaces (with or without supply of electricity), it is thus preferred to have a glass that has a high transmission (in the infrared range) to increase the melting efficiency. As regards the refining operation, suitable refining agents include $As_2O_3$, $Sb_2O_3$, $SnO_2$, $CeO_2$, and sulfate or fluoro compounds, including mixtures thereof. $As_2O_3$ and $Sb_2O_3$, more particularly $As_2O_3$, have been used extensively. The others, which are less toxic, have more recently been proposed as alternatives to $As_2O_3$ and $Sb_2O_3$.

The specifications for glass-ceramic cooking top plates, and thus for the glass-ceramic of which they are made, can be particularly stringent. Besides mechanical properties (breaking strength, resistance to heat shocks, etc.) and properties of chemical resistance to acids and bases, which are compatible with their use, such top plates can have specific optical properties. Such optical properties may include (i) a low capacity to transmit visible light, such that the user can not, or can only with difficulty, distinguish the underlying heating elements when they are not in use; (ii) the ability to see, firstly, said heating elements when they are in use, without, however, dazzling the user (so as to reduce the risks of burns on contact with the hot top plate) and, secondly, displays; and (iii) good energy transmission properties, in particular of the infrared radiation produced by the heating elements (so as to enable the foods to be heated in the shortest possible time).

Current cooking top plates, which are dark-colored, are colored with vanadium oxide ($V_2O_5$). The vanadium oxide can be added to the raw materials of the glass that is the precursor of the glass-ceramic before performing the melting. It gives the glass-ceramic obtained after ceramming a very deep brown-red shade, associated with the reduction of the vanadium (vanadium having a valency of +5 to vanadium having a valency of +3 and/or +4).

These glass-ceramics colored with vanadium oxide have the optical properties recalled above and, in particular, they allow wavelengths in the red range (above 600 nm) to pass through, such that heating elements brought to high temperature and displays made using electroluminescent diodes that emit in the red range are visible through cooking top plates made of these glass-ceramics. Such top plates are highly absorbent in the wavelength range 450-480 nm corresponding to blue light. Thus, they transmit little or no color emitted by blue electroluminescent diodes.

It has recently been found that there is a need to be able also to see blue-colored displays through such glass-ceramics top plates. To satisfy this need, top plates are thus proposed, which, besides the properties, more particularly the optical properties, recited above, must have a non-zero capacity to transmit wavelengths of the visible range between 450 and 480 nm (limits inclusive), corresponding to blue light.

U.S. Pat. No. 5,212,122 describes colored transparent glass-ceramics whose transmission in the infrared range may be adjusted by the action of dye(s) chosen from $MnO_2$, $Fe_2O_3$, CoO, NiO, $V_2O_5$, $Cr_2O_3$ and mixtures thereof. Vanadium oxide is not necessarily present in said glass-ceramics. The effect on the transmission in the infrared range of the dyes CoO, NiO and $V_2O_5$ is not differentiated. The technical problem of transmission in the blue range is not addressed.

European patent application EP 1 313 675 describes transparent glass-ceramics containing a solid solution of β-quartz as a main crystal phase. Said glass-ceramics do not contain either As or Sb. Rather, the chemical refining of the precursor glass is performed with an alternative refining agent chosen from $SnO_2$, $CeO_2$, and sulfate or fluoro compounds. The chemical refining is performed at high temperature (at a temperature above 1700° C. and especially above 1975° C.) to give high-quality results, and they are colored with $V_2O_5$ combined with at least one reducing agent. Said glass-ceramics have an optical transmission at 1600 nm of greater than 65% for a thickness of 4 mm. The technical problem of transmission in the blue range is not addressed in said document.

European patent application EP 1 465 460 mentions glass-ceramic cooking top plates whose light transmission Y, integrated over the entire visible spectrum, measured with the illuminant C, is from 2.5 to 15 at a thickness of 3 mm. Such high transmission inevitably leads to the possibility of seeing the heating elements through the cooking top plate when it is not in use. Moreover, said patent application recommends the use, in order to obtain the desired results, of an oxidized precursor glass, which has little coloration since the vanadium present is predominantly in the oxidized state ($V^{5+}$). During ceramming of said glass, said vanadium is reduced, especially by arsenic and/or iron, resulting in the dark color of the final glass-ceramic. It is, however, more than likely that said vanadium is not entirely reduced during the ceramming, and that it continues to be reduced in the course of using the cooking top plate as a result of the high temperatures to which said cooking top plate is subjected. This results in a phenomenon of aging of the cooking top plate. It gradually darkens over time. In any case, EP 1 465 460, in reference to the technical problem of the transmission of blue, green, yellow, red, in fact of the transmission of all colors (see the high Y values indicated), develops an approach essentially based on reduction of the vanadium.

With reference to the specific problem of the selective transmission of blue, another approach includes coloration via the combined action of dyes.

DETAILED DESCRIPTION

In the context recalled hereinabove, Applicants propose novel transparent glass-ceramics, including vanadium oxide (i.e., of dark color), containing a solid solution of β-quartz as the main crystal phase. Characteristically, such novel glass-ceramics, which constitute one embodiment of the disclosure, simultaneously have:
  a) an optical transmission, for any wavelength between 1000 and 2500 nm (infrared), of greater than 50% and advantageously greater than 60%, for a thickness of 3 mm;
  b) an integrated transmission Y, in the visible range between 380 and 780 nm, measured with the illuminant C, of between 1.5% and 5% (limits inclusive), for a thickness of 3 mm; and
  c) an optical transmission, for any wavelength between 450 and 480 nm (blue), of greater than 0.5%, and advantageously greater than 0.8%, for a thickness of 3 mm.

Said glass-ceramics have good infrared radiation transmission properties (point a above). Since the inventors have observed that excessively high infrared transmission is not necessarily favorable in a context of optimizing heating times, they recommend, according to an advantageous variant, that the infrared transmission, greater than 50% and advantageously greater than 60%, should remain less than or equal to 80% at 1300 nm.

Said glass-ceramics have low capacity for transmitting visible light (point b above). The integrated transmission values (Y) indicated correspond to values measured with the illuminant C.

Said glass-ceramics have a non-zero capacity for transmitting wavelengths in the visible range, between 450 and 480 nm (limits inclusive), corresponding to blue light (point c above). They have an optical transmission of said wavelengths of greater than 0.5% (advantageously greater than 0.8%), for a thickness of 3 mm. It is noted that an optical transmission of said wavelengths of greater than 0.5% for a thickness of 3 mm corresponds to an optical transmission of said wavelengths of greater than about 12% for a thickness of 1 mm.

Such glass-ceramics thus combine, surprisingly, low overall transmission in the visible range ($1.5\% \leq Y \leq 5\%$) with, on the one hand, good transmission in the red range and in the infrared range ($T_{IR} > 50\%$) and, on the other hand, significant transmission in the blue range ($T_{blue} > 0.5\%$). It has been seen that these transmission values are given for a glass-ceramic thickness of 3 mm.

In the context of a preferred embodiment, the glass-ceramics of the disclosure combine, in their composition, with the vanadium oxide, cobalt oxide, in the absence of a significant amount (or even advantageously in the absence) of nickel oxide.

With reference to the properties of the desired glass-ceramic (the specifications outlined in the introduction of the present text), cobalt oxide was found to be a preferred partner for vanadium oxide. The two oxides, used in combination, are capable of acting complementarily in the materials under consideration, to afford simultaneously:
  significant transmission of the wavelengths corresponding to blue light,
  low overall transmission in the visible range, and
  good transmission in the infrared range.

What is more, cobalt has the advantage of remaining in the divalent form during the production of the glass-ceramics and also within them. Consequently, its absorption is not sensitive to redox phenomena.

In the glass-ceramics disclosed herein, the nickel oxide is thought to be responsible for absorption in a wavelength range (visible) relatively close to that of cobalt oxide. However, this absorption is thought to be much less intense. Thus, to obtain the desired effect (transmission in the blue range with a low Y transmission), large amounts of nickel oxide could be introduced, which would inevitably impair the transmission in the infrared range. Thus, the disclosed glass-ceramics do not contain, in the context of one embodiment, significant amounts of nickel oxide. The nickel oxide, if it is present, is, in any case, present to less than 0.02% by weight (with reference to a glass-ceramic composition expressed in weight percentages of oxides).

The glass-ceramics according to an embodiment contain:
  vanadium oxide;
  cobalt oxide; and
  little or no nickel oxide ($NiO \leq 0.02$ wt. %).

Advantageously, they contain no nickel oxide.

Vanadium oxide is present in a smaller amount than in the glass-ceramics of the prior art, in which it is found as the sole dye responsible for dark color. It is generally present in a content of less than or equal to 0.2% by weight. It is generally present in a content of between 0.01% and 0.2% by weight.

Cobalt oxide is present in an effective amount, generally from 0.01% to 0.12% by weight.

The disclosed glass-ceramic compositions (expressed as weight percentages of oxide) can contain:
  from 0.01% to 0.2% of vanadium oxide;
  from 0.01% to 0.12% of cobalt oxide; and
  less than 0.02% of nickel oxide (preferably, they contain no nickel oxide).

With reference to the content of vanadium oxide, the following may also be pointed out.

It has been seen hereinabove that it is the reduced forms of vanadium that are responsible for the absorption. Consequently, the vanadium content necessary in the disclosed glass-ceramics may vary within a quite wide range (see the range recommended above: 0.01% to 0.2% by weight), as a function of the exact conditions for performing the melting of the precursor glass (more or less oxidative conditions) and of the other multivalent elements present in the composition, especially refining agents.

The glass-ceramics can contain at least one refining agent, generally chosen from $As_2O_3$, $Sb_2O_3$, $SnO_2$, $CeO_2$, and sulfate or fluoro compounds, and mixtures thereof, advantageously chosen from $SnO_2$, $CeO_2$, and sulfate or fluoro compounds, and mixtures thereof (according to this advantageous variant, neither $As_2O_3$ nor $Sb_2O_3$ is used). The glass-ceramics advantageously contain an effective amount, as refining agent, of $SnO_2$.

The glass-ceramics thus contain such refining agents, which are capable of acting, to a greater or lesser extent, on the valency level of the vanadium present. In the presence of $SnO_2$ (without $As_2O_3$ and $Sb_2O_3$), which tends to greatly reduce the vanadium, the content of vanadium oxide can vary from 0.01% to 0.04% by weight (such a content is sufficient), whereas in the presence of arsenic and/or antimony (e.g., $As_2O_3$ and/or $Sb_2O_3$), a higher content, from 0.1% to 0.2% by weight, can be included.

With reference to the low content of 0.01% to 0.04% by weight of $V_2O_5$ (content much lower than the conventional amount in the colored glass-ceramics of the prior art), it may be added that the "weak" absorption in the infrared range resulting therefrom is compensated for by the presence, in the disclosed glass-ceramic products, of cobalt oxide.

According to one variant, the compositions of the glass-ceramic products contain:
  from 0.1% to 0.2% by weight of vanadium oxide;
  from 0.01% to 0.12% by weight of cobalt oxide;
  less than 0.02% by weight of nickel oxide (advantageously none); and as the refining agent of the precursor glass, an effective amount of $As_2O_3$ and/or $Sb_2O_3$ (said effective amount being generally 0.1-1% by weight).

According to another variant, which is preferred, the compositions of the glass-ceramics are free of $As_2O_3$ and $Sb_2O_3$ and contain:

from 0.01% to 0.04% by weight of vanadium oxide;

from 0.01% to 0.12% and advantageously from 0.001% to 0.07% by weight of cobalt oxide;

less than 0.02% by weight of nickel oxide (advantageously none); and as the refining agent of the precursor glass, an effective amount of $SnO_2$ (said effective amount being generally of 0.05-0.5% by weight, more generally of 0.1-0.5% by weight, advantageously of 0.2-0.5% by weight).

If As and/or Sb are present, they may be present only in trace amounts, i.e., in amounts generally less than 200 ppm (non-effective amounts in reference to the refining of the precursor glass). Said traces originate, for example, from impurities present in the starting materials.

Coloring elements, other than $V_2O_5$, CoO (and NiO in small amounts) may be present in the composition of the glass-ceramics, but in small amounts, so as not to significantly modify the transmission in the visible range and in the infrared range of said glass-ceramics (and so as not to significantly reduce the transmission of their precursor glasses in the infrared range). Advantageously, the disclosed glass-ceramics contain, as active colorants, only $V_2O_5$ and CoO.

The glass-ceramics are liable to contain iron oxide ($Fe_2O_3$), present as an impurity in the starting materials. Advantageously, the iron oxide is not present to more than 0.1% by weight, and as such it does not significantly modify the transmission properties.

The concept of the glass-ceramics disclosed herein is not limited to any particular type of β-quartz glass-ceramic. It may be available within any type of β-quartz glass-ceramic, and especially in β-quartz glass-ceramics whose composition (expressed in weight percentages of oxides) consists essentially of:

| | |
|---|---|
| $SiO_2$ | 60-72 |
| $Al_2O_3$ | 18-23 |
| $LiO_2$ | 2.5-4.2 (e.g., 2.5-4) |
| MgO | 0-3 |
| ZnO | 1-3 |
| $TiO_2$ | 1.5-4 |
| $ZrO_2$ | 0-2.5 |
| BaO | 0-3 |
| SrO | 0-3 |
| CaO | 0-2 |
| $Na_2O$ | 0-1.5 |
| $K_2O$ | 0-1.5 |
| $P_2O_5$ | 0-5 |
| $As_2O_3$ | 0-1 |
| $Sb_2O_3$ | 0-1 |
| $SnO_2$ | 0-0.5 |
| $V_2O_5$ | 0.01-0.2 |
| CoO | 0.01-0.12 |
| $Fe_2O_3$ | 0.005-0.1. |

Such compositions contain an effective amount of at least one refining agent chosen from $As_2O_3$, $Sb_2O_3$ and $SnO_2$.

Advantageously, the disclosed glass-ceramics comprises β-quartz glass-ceramics whose composition (expressed in weight percentages of oxides) consists essentially of:

| | |
|---|---|
| $SiO_2$ | 60-72 |
| $Al_2O_3$ | 18-23 |
| $LiO_2$ | 2.5-4.2 (e.g., 2.5-4) |
| MgO | 0-3 |
| ZnO | 1-3 |
| $TiO_2$ | 1.5-4 |
| $ZrO_2$ | 0-2.5 |
| BaO | 0-3 |
| SrO | 0-3 |
| CaO | 0-2 |
| $Na_2O$ | 0-1.5 |
| $K_2O$ | 0-1.5 |
| $P_2O_5$ | 0-5 |
| $As_2O_3$ | 0 (or only trace amounts) |
| $Sb_2O_3$ | 0 (or only trace amounts) |
| $SnO_2$ | 0.2-0.4 |
| $V_2O_5$ | 0.01-0.04 |
| CoO | 0.01-0.12 (e.g., 0.01-0.07) |
| $Fe_2O_3$ | 0.005-0.1. |

$SnO_2$ can be included as the sole refining agent.

$SnO_2$ can be included as the sole refining agent.

It has been indicated that the above compositions "consist essentially of" the given list of oxides. This means that, in said compositions, the sum of the listed oxides represents at least 95% and generally at least 98% by weight. It is not entirely excluded to find, in small amounts, other elements in said compositions, such as lanthanum or yttrium oxides. The presence of dyes other than $V_2O_5$ and CoO is not desired.

According to a further embodiment, the present disclosure relates to articles at least partly made of a disclosed glass-ceramic composition. Said articles are advantageously made entirely of the glass-ceramic composition disclosed herein.

Said articles advantageously consist of cooking top plates. Such cooking top plates are generally made entirely of a glass-ceramic, but it is not excluded for them to be only partly made thereof (on the same top plate, it is possible to find, for example, an area of β-quartz and an area of opaque β-spodumene).

It is noted, however, that the field of application is not limited to cooking top plates. The disclosed articles may also especially consist of cooking utensils or optical filters.

According to a further embodiment, the disclosure relates to lithium alumino-silicate glasses, which are precursors of the disclosed glass-ceramics. Said glasses advantageously have a composition, as described above, that contains both $V_2O_5$ and CoO (most advantageously $V_2O_5$, CoO and $SnO_2$), with little and preferably no NiO. Said glasses advantageously have an optical transmission, for any wavelength between 1000 and 2500 nm, of greater than 60%, for a thickness of 3 mm. This makes them easier to melt.

According to yet a further embodiment, disclosed is a process for producing a glass-ceramic as described above. Said process includes heat treatment of a lithium alumino-silicate glass, which is a precursor of such a glass-ceramic, or of a mixture of mineral raw materials, which is itself a precursor of such a lithium alumino-silicate glass, under conditions that ensure successive melting, refining and then cramming Said process can be performed with suitable ingredients, to obtain a glass-ceramic as disclosed herein, a dark β-quartz glass-ceramic that has the novel optical properties mentioned above. It is advantageously performed with a glass or a mineral load whose composition corresponds to that of a glass-ceramic according to one embodiment (i.e., a glass-ceramic whose composition contains $V_2O_5$, CoO and little or no NiO).

According to a further embodiment, disclosed is a process for producing an article as described above. Said process includes:

melting of a lithium alumino-silicate glass or of a mixture of mineral raw materials, which is a precursor of such a glass, said glass or said mixture containing n effective and not excessive amount of at least one refining agent, followed by refining the molten glass obtained;

cooling of the refined molten glass obtained, and, simultaneously, forming thereof in the form desired for the targeted article; and ceramming of said formed glass.

Said process is performed with suitable ingredients, to obtain an article whose structure contains, or even consists of, a β-quartz glass-ceramic having the novel optical properties mentioned above. It is advantageously performed with a glass or a mineral load whose composition corresponds to that of a glass-ceramic according to one embodiment (i.e., a glass-ceramic whose composition contains $V_2O_5$, CoO and little or no NiO).

The ceramming step of the above two processes is performed to obtain a β-quartz glass-ceramic. It includes two successive steps:

a (first) step of nucleation during which the product is brought to a temperature generally of between 680° C. and 820° C., for a time generally of between 15 minutes and 2 hours, and a (second) step of crystal growth during which the product is brought to a temperature generally of between 870° C. and 990° C. for a time generally of between 15 minutes and 2 hours. It is well known to those skilled in the art that if this crystal growth treatment is performed for too long and/or at too high a temperature, the solid solution of n-quartz transforms into a solid solution of β-spodumene, which is accompanied by opacification of the product.

According to one variant of the above two processes, which is particularly advantageous when the melting is performed in a combustion furnace (and with or without supply of electricity), the precursor glass (used as starting material or resulting from the melting of a mineral load) has an optical transmission, for any wavelength between 1000 and 2500 nm, of greater than 60%, for a thickness of 3 mm. The melting (and refining) step may thus be optimized.

It is noted herein that the characteristic coloration of the glass-ceramics and glass-ceramic articles obtained according to the disclosed embodiments, based on the combined action of $V_2O_5$ and CoO, is sparingly sensitive to the exact implementation conditions of the processes for obtaining said glass-ceramics and glass-ceramic articles (starting materials used, melting temperature, etc.). This is a very advantageous point.

According to a further embodiment, the disclosure relates to the combined use of vanadium oxide and cobalt oxide for the preparation of a glass-ceramic or an article having the optical properties mentioned above, advantageously for the preparation of a glass-ceramic or an article according to the advantageous variants mentioned above. It is possible to speak of a combined use insofar as these two dyes produce within the glass-ceramic complementary actions with regard to the mentioned specifications (good transmission in the infrared range, low transmission in the visible range and significant transmission in the blue range). These two dyes are used in the absence of a significant amount of nickel oxide, advantageously in the absence of nickel oxide, and in any case in the presence of less than 0.2% by weight of nickel oxide.

They are advantageously used in the presence of $SnO_2$, which acts as a refining agent. With regard to the advantageous amounts to incorporate of the various oxides, reference is made to the above statements. A person skilled in the art will already have appreciated the value of the present disclosure. Said disclosure is now illustrated by the examples hereinbelow.

Example A (Embodiment) and Comparative Examples 1 and 2

To produce 1 kg-batches of precursor glass, the starting materials, in the proportions (proportions expressed in weight percentages of oxides) given in the first part of Table 1 below, are carefully mixed together.

The mixtures are placed in silica crucibles and melted at 1650° C.

After melting, the glasses are rolled to a thickness of 6 mm and annealed at 680° C. for 1 hour.

The infrared (IR) transmission T of the glasses was measured on polished samples of 3 mm thick.

Samples of glass (in the form of plates of about 10 cm×10 cm) were then cerammed by being subjected to the following heat treatment:

rapid heating to 700° C., heating from 700° C. to 800° C. at a heating rate of 3° C./minute, heating from 800° C. to 925° C. at a heating rate of 12° C./minute, maintenance at 925° C. for 15 minutes, cooling at the cooling rate of the furnace.

The optical properties of the glass-ceramic plates obtained were measured on polished samples 3 and 1 mm thick. The illuminant C (observer at 2°) was used.

The optical properties of the glasses and glass-ceramics are given in the second part of Table 1 below.

Example A is an example of one embodiment.

Examples 1 and 2 are comparative examples. The glass-ceramic of Example 1, which contains an excessive content of CoO, shows an excessively low transmission in the infrared range. The glass-ceramic of Example 2, which contains NiO, has an excessively high transmission in the visible range and an excessively low transmission in the infrared range.

TABLE 1

| Examples | A | 1 | 2 |
|---|---|---|---|
| Composition | | | |
| $SiO_2$ | 68.8 | 68.8 | 68.8 |
| $Al_2O_3$ | 19.5 | 19.5 | 19.5 |
| $Li_2O$ | 3.45 | 3.45 | 3.45 |
| MgO | 0.88 | 0.88 | 0.88 |
| ZnO | 1 | 1 | 1 |
| $TiO_2$ | 2.6 | 2.6 | 2.6 |
| $ZrO_2$ | 1.8 | 1.8 | 1.8 |
| BaO | 0.75 | 0.75 | 0.75 |
| $As_2O_3$ | 0.9 | 0.9 | 0.9 |
| $V_2O_5$ | 0.15 | 0.15 | 0.15 |
| CoO | 0.1 | 0.15 | |
| NiO | | | 0.15 |
| $Fe_2O_3$ | 0.04 | 0.04 | 0.04 |
| Optical properties | | | |
| Precursor glass | | | |
| IR | | | |
| Minimum T between 1000 and 2500 nm (sample 3 mm thick) | 72% | 60% | 65% |
| Glass-ceramic | | | |
| IR | | | |
| Minimum T between 1000 and 2500 nm (sample 3 mm thick) | 60% | 52% | 49% |
| Visible | | | |

TABLE 1-continued

| Examples | A | 1 | 2 |
|---|---|---|---|
| Minimum T between 450 and 480 nm (sample 1 mm thick) | 16% | | |
| Y | | | |
| (sample 3 mm thick) | 3.8% | 2.4% | 23.3% |

Examples B, C, D and E (Embodiments)

To produce 2 kg-batches of precursor glass, the starting materials, in the proportions (proportions expressed in weight percentages of oxides) given in the first part of Table 2 below, are carefully mixed together.

The mixtures are placed in platinum crucibles and melted at 1650° C.

After melting, the glasses are rolled to a thickness of 6 mm and annealed at 650° C. for 1 hour.

The infrared (IR) transmission T of the glasses was measured on polished samples 3 mm thick.

Samples of glass (in the form of plates of about 10 cm×10 cm) were then cerammed by being subjected to the heat treatments below.

Example B
rapid heating to 650° C.,
rise over 24 minutes from 650 to 820° C.,
rise over 10 minutes from 820 to 880° C.,
maintenance at 880° C. for 10 minutes,
cooling at the cooling rate of the furnace.
Examples C and D
rapid heating to 650° C.,
rise over 24 minutes from 650 to 820° C.,
rise over 10 minutes from 820 to 970° C.,
maintenance at 970° C. for 10 minutes,
cooling at the cooling rate of the furnace.
Example E
rapid heating to 650° C.,
rise over 31 minutes from 650 to 820° C.,
rise over 7 minutes from 820 to 920° C.,
maintenance at 920° C. for 10 minutes,
cooling at the cooling rate of the furnace.

The optical properties of the ceramed glass plates (glass-ceramic plates) obtained were measured on polished samples 3 mm thick. The illuminant C (observer at 2°) was used.

The optical properties of the glasses and glass-ceramics are given in the second part of Table 2 below.

TABLE 2

| Examples | B | C | D | E |
|---|---|---|---|---|
| Composition | | | | |
| $SiO_2$ | 65.13 | 68.85 | 68.8 | 65.665 |
| $Al_2O_3$ | 20.5 | 19.3 | 19.3 | 20.2 |
| $Li_2O$ | 3.8 | 3.55 | 3.55 | 3.8 |
| MgO | 0.4 | 1.1 | 1.1 | 0.4 |
| ZnO | 1.5 | 1.6 | 1.6 | 1.5 |
| $TiO_2$ | 3 | 2.65 | 2.65 | 2.9 |
| $ZrO_2$ | 1.35 | 1.7 | 1.7 | 1.2 |
| BaO | 2.5 | 0.8 | 0.8 | 2.6 |
| CaO | 0.45 | | | 0.5 |
| $Na_2O$ | 0.65 | | | 0.6 |
| $K_2O$ | 0.3 | | | 0.2 |
| $SnO_2$ | 0.3 | 0.3 | 0.3 | 0.3 |
| $V_2O_5$ | 0.02 | 0.02 | 0.02 | 0.03 |
| CoO | 0.02 | 0.05 | 0.1 | 0.015 |
| $Fe_2O_3$ | 0.08 | 0.08 | 0.08 | 0.09 |

TABLE 2-continued

| Examples | B | C | D | E |
|---|---|---|---|---|
| Optical properties* Precursor glass IR | | | | |
| Minimum T between 1000 and 2500 nm (%) Glass-ceramic IR | | 61 | 62 | 76 |
| Minimum T between 1000 and 2500 nm (%) | 6571 | 60 | 5558 | 68.60 |
| T at 1300 nm 5%) Visible | | 64 | | 73.10 |
| Minimum T between 450 and 480 nm (%) | 0.87 | 0.6 | 1 | 1.3 |
| Y (%) | 3.3 | 2.8 | 2.6 | 3.2 |

*measured on samples 3 mm thick.

The invention claimed is:

1. A transparent glass-ceramic, including vanadium oxide, containing a solid solution of β-quartz as a main crystal phase, comprising:
   an optical transmission, for any wavelength between 1000 and 2500 nm, of greater than 50% for a thickness of 3 mm;
   an integrated transmission Y, in the visible range between 380 and 780 nm, measured with an illuminant C, of between 1.5% and 5%, for a thickness of 3 mm; and
   an optical transmission, for any wavelength between 450 and 480 nm, of greater than 0.5% for a thickness of 3 mm, wherein a composition of the glass-ceramic includes vanadium oxide, cobalt oxide, and less than 0.02% by weight of nickel oxide, and contains, as a refining agent, $SnO_2$ and vanadium oxide in an amount of 0.01% to 0.04% by weight.

2. The glass-ceramic according to claim 1, the composition of which, expressed in percentages by weight of oxides, contains:
   from 0.01% to 0.12% of cobalt oxide.

3. The glass eeramme according to claim 1, the composition of which contains, as a refining agent, $As_2O_3$ and/or $Sb_2O_3$.

4. The glass-ceramic according to claim 1, the composition of which contains no more than 0.1% by weight of $Fe_2O_3$.

5. The glass-ceramic according to claim 1, the composition of which, expressed in percentages by weight of oxides, consists essentially of:

| | |
|---|---|
| $SiO_2$ | 60-72 |
| $Al_2O_3$ | 18-23 |
| $LiO_2$ | 2.5-4.2 |
| MgO | 0-3 |
| ZnO | 1-3 |
| $TiO_2$ | 1.5-4 |
| $ZrO_2$ | 0-2.5 |
| BaO | 0-3 |
| SrO | 0-3 |
| CaO | 0-2 |
| $Na_2O$ | 0-1.5 |
| $K_2O$ | 0-1.5 |
| $P_2O_5$ | 0-5 |
| $As_2O_3$ | 0-1 |
| $Sb_2O_3$ | 0-1 |
| $SnO_2$ | 0.05-0.5 |
| $V_2O_5$ | 0.01-0.04 |
| CoO | 0.01-0.12 |

-continued

| | |
|---|---|
| Fe$_2$O$_3$ | 0.005-0.1. |

6. The glass-ceramic according to claim 1, the composition of which, expressed in percentages by weight of oxides, consists essentially of:

| | |
|---|---|
| SiO$_2$ | 60-72 |
| Al$_2$O$_3$ | 18-23 |
| LiO$_2$ | 2.5-4.2 |
| MgO | 0-3 |
| ZnO | 1-3 |
| TiO$_2$ | 1.5-4 |
| ZrO$_2$ | 0-2.5 |
| BaO | 0-3 |
| SrO | 0-3 |
| CaO | 0-2 |
| Na$_2$O | 0-1.5 |
| K$_2$O | 0-1.5 |
| P$_2$O$_5$ | 0-5 |
| As$_2$O$_3$ | 0 |
| Sb$_2$O$_3$ | 0 |
| SnO$_2$ | 0.2-0.4 |
| V$_2$O$_5$ | 0.01-0.04 |
| CoO | 0.01-0.12 |
| Fe$_2$O$_3$ | 0.005-0.1. |

7. An article made at least partly of a glass-ceramic according to claim 1.

8. The article according to claim 7, consisting of a cooking top plate.

9. A process for producing an article according to claim 7, successively including:
   melting of a lithium alumino-silicate glass or of a mixture of mineral raw lithium alumino-silicate glass precursor materials, said glass or said mixture containing at least one refining agent, followed by refining of the molten glass obtained;
   cooling of the refined molten glass obtained and, simultaneously, forming it into a desired form for the targeted article; and
   ceramming of said formed glass, wherein said glass or said precursor material mixture have a composition that includes vanadium oxide, cobalt oxide, and less than 0.02% by weight of nickel oxide.

10. A process for producing a glass-ceramic according to claim 1, including heat treatment of a lithium alumino-silicate glass precursor or of a mixture of mineral raw lithium alumino-silicate glass precursor materials under conditions that successively ensure melting, refining and then ceramming, said glass or said precursor material mixture have a composition that includes vanadium oxide, cobalt oxide, and less than 0.02% by weight of nickel oxide.

11. The process according to claim 10, wherein said lithium alumino-silicate glass has an optical transmission, for any wavelength between 1000 and 2500nm, of greater than 60%, for a thickness of 3 mm.

* * * * *